United States Patent
Dunn et al.

(10) Patent No.: US 7,316,176 B2
(45) Date of Patent: Jan. 8, 2008

(54) REMOTE MONITOR SYSTEM FOR A LONGITUDINALLY POSITIONABLE CONTROL BAR

(75) Inventors: Jerry Lee Dunn, Sperry, OK (US); Michael Lynn Rice, Tulsa, OK (US)

(73) Assignee: TDW Delaware, Inc., Wilmington, DE (US)

( * ) Notice: Subject to any disclaimer, the term of this patent is extended or adjusted under 35 U.S.C. 154(b) by 182 days.

(21) Appl. No.: 11/213,467

(22) Filed: Aug. 26, 2005

(65) Prior Publication Data
US 2007/0044652 A1  Mar. 1, 2007

(51) Int. Cl.
*F01B 31/12* (2006.01)
*H04N 7/18* (2006.01)
(52) U.S. Cl. .......................................... 92/5 R; 348/82
(58) Field of Classification Search ................. 92/5 R; 91/1; 348/82, 84
See application file for complete search history.

(56) References Cited

U.S. PATENT DOCUMENTS

| | | | |
|---|---|---|---|
| 2,912,495 A | 11/1959 | Moon et al. | |
| 3,614,252 A | 10/1971 | Rose et al. | |
| 4,579,484 A | 4/1986 | Sullivan | |
| 4,880,028 A | 11/1989 | Osburn et al. | |
| 4,977,418 A * | 12/1990 | Canty ........................... | 348/82 |
| 5,056,046 A | 10/1991 | Mutchler et al. | |
| 5,068,720 A * | 11/1991 | Herlitz et al. .................. | 348/82 |
| 5,125,670 A | 6/1992 | Hamlett, II et al. | |
| 5,439,331 A | 8/1995 | Andrew et al. | |
| 5,612,499 A | 3/1997 | Andrew et al. | |
| 5,653,250 A | 8/1997 | Sigmund et al. | |
| 6,012,878 A | 1/2000 | Hicks | |
| 6,338,359 B1 | 1/2002 | Welker | |
| 6,505,525 B2 * | 1/2003 | McGrew ....................... | 348/82 |
| 6,648,562 B1 | 11/2003 | Calkins et al. | |
| 2002/0031567 A1 | 3/2002 | Magario | |
| 2004/0231408 A1 | 11/2004 | Shammai | |

\* cited by examiner

*Primary Examiner*—Michael Leslie
(74) *Attorney, Agent, or Firm*—Gable Gotwals

(57) ABSTRACT

A remote monitor system for a longitudinally positionable control bar having position indicating indicia thereon including a housing receiving the control bar therein and having an aperture in a sidewall communicating between the control bar and an exterior housing surface, an explosion proof enclosure mounted exteriorly of the housing and having a transparent window in alignment with the aperture, a video camera positioned within the explosion proof enclosure having a lens with a visual path through the window and in alignment with the housing aperture, a radio transmitter within the explosion proof enclosure connected to the camera and configured to transmit a signal of video images provided by the camera; and a battery power source within the explosion proof enclosure providing energy to the camera and transmitter for providing remotely receivable control bar position indicating images.

7 Claims, 4 Drawing Sheets

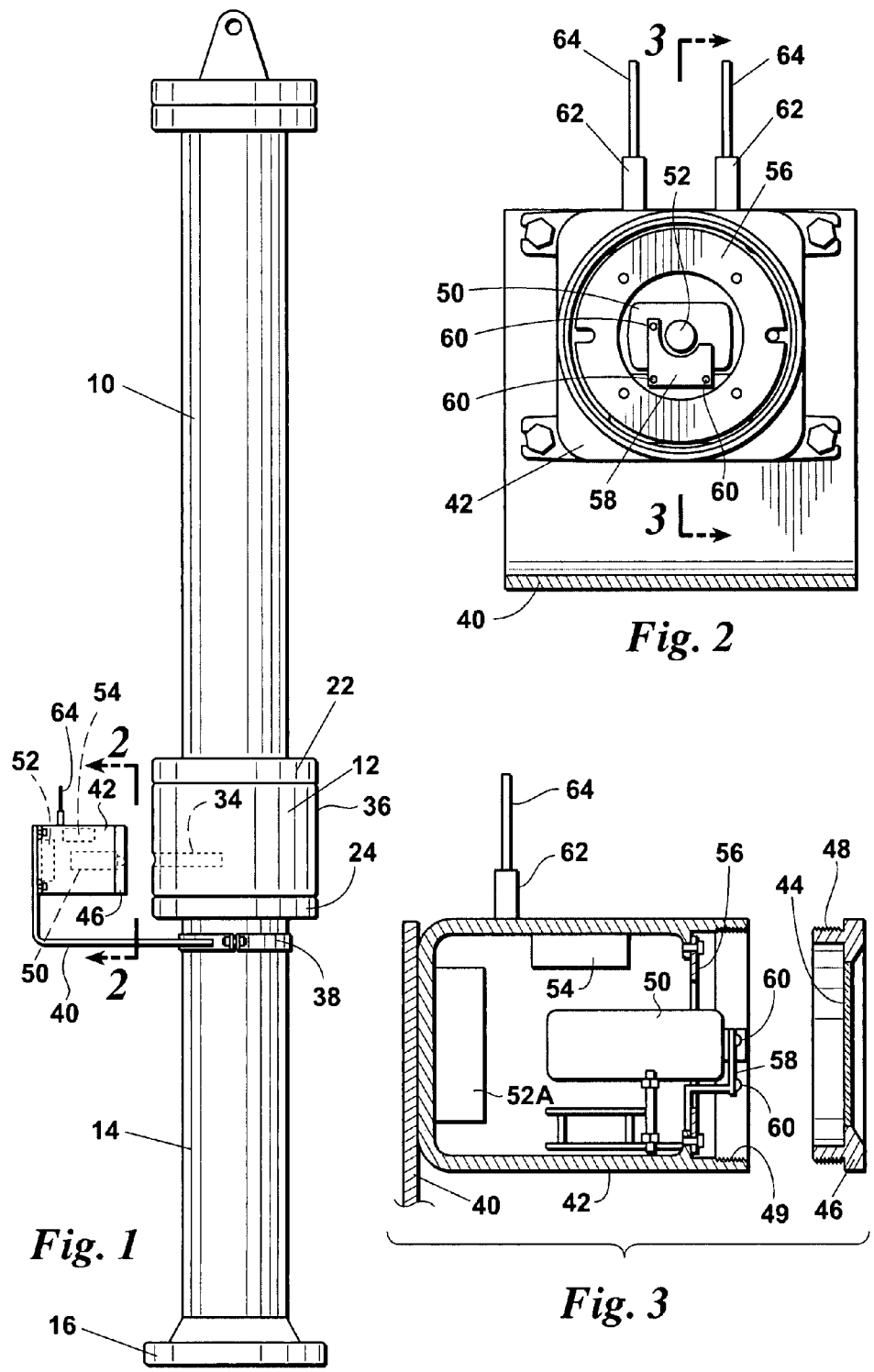

REMOTE MONITOR SYSTEM FOR A LONGITUDINALLY POSITIONABLE CONTROL BAR

REFERENCE TO PENDING APPLICATIONS

This application is not based upon any pending domestic or international patent applications.

REFERENCE TO MICROFICHE APPENDIX

This application is not referenced in any microfiche appendix.

BACKGROUND OF THE INVENTION

1. Field of the Invention

This invention relates to remote monitor systems for control bars having position indicating indicia thereon.

2. Description of the Prior Art

In the operation of refineries, chemical manufacturing facilities, storage facilities and so forth, it is occasionally necessary to penetrate the wall of a pipe or a pipeline for repair and maintenance purposes. In many instances such pipelines are under pressure, and frequently high pressure, or carry contents that are at a high temperature that would result in severe burns if contact is made with a workman, or in some instances the liquids within such pipelines are hazardous to health, such as ammonia or similar vapors and even more particularly, wherein liquids or gases flowing through the pipelines being tapped are explosive. Therefore tapping a pipeline can be hazardous. For this reason it is sometimes important that the operator of equipment, such as equipment for hot tapping a pipeline, be operated from a remote location so that in the event of a failure or accident, the operator will be safe from serious injury.

The essence of the invention herein described is a system that enables an operator to observe the position of a control bar that is typically part of pipeline plugging equipment by enabling the operator to read marking indicia on a plugging cylinder control bar. Further, the invention herein is concerned with a remote monitor system for a longitudinally positionable control bar that enables the operator to be constantly aware of the control bar's position but wherein the operator is remotely positioned to avoid the possibility of injury.

An example of the type of equipment for which the remote monitor system of this invention can be effectively employed is illustrated in pending U.S. patent application Ser. No. 11/132,773, filed May 19, 2005 entitled High Temperature Completion Plug, Charles D. Calkins and Jack E. Miller, Applicants.

BRIEF SUMMARY OF THE INVENTION

The invention herein is a remote monitor system for a longitudinally positionable control bar. The monitoring system includes a housing having the control bar therein and having an aperture in a sidewall that communicates between the control bar and the exterior of the housing.

An explosion proof enclosure is mounted exteriorly of the housing. The explosion proof enclosure has a transparent window in alignment with the aperture.

A video camera is positioned within the explosion proof housing having a lens with a visual path through the window and in alignment with the housing aperture. A radio transmitter within the explosion proof enclosure is connected to the camera and is configured to transmit the signal of video images produced by the camera. The radio transmitter can be integral with the camera.

In addition, a light source, which can be in the form of light emitting diodes, is positioned within the explosion proof housing adjacent to but slightly rearwardly of the camera lens. The light source is placed to transmit light from within the explosion proof housing through the transparent window and through the aperture leading to the control bar so that sufficient light is reflected from the control bar to accurately reveal indicia passing in view through the aperture.

A battery power voltage source within the explosion proof enclosure provides energy to the camera, light source and transmitter for providing remotely receivable control bar position indicating images.

A transmitting antenna is affixed to an exterior surface of the explosion proof housing and sealably communicates with the camera and transmitter positioned within the housing.

A magnetically actuatable switch is mounted within the explosion proof housing and connected between the battery powered voltage source, the camera and light source so that by means of an actuator in the form of a magnet that is positioned adjacent the exterior of the explosion proof housing the camera and light source may be turned on or off without having to provide direct contact through the wall of the housing.

For background information relating to the basic subject matter of the invention herein, reference may be had to the following previously issued United States patents:

| U.S. Pat. No. | Inventor | Title |
| --- | --- | --- |
| 2,912,495 | Moon et al. | Device For Viewing Oil Well Bore Hole |
| 5,056,046 | Mutchler et al. | Pneumatic Operated Valve Data Acquisitioner |
| 5,125,670 | Hamlett, II et al. | Vertical Backboard-Tether Ball Amusement Device |
| 5,612,499 | Andrew | Method of Inserting A Sensor Into A Pipeline |
| 5,653,250 | Sigmund et al. | Vapor-Liquid Equilibrium and Interfacial Tension Measuring Apparatus and Method |
| 6,338,359 | Welker | Dual Automated Insertion Device |

-continued

| U.S. Pat. No. | Inventor | Title |
|---|---|---|
| 2002/0031567 | Magario | Internet-Based Remote Control System For Molding Machine |
| 2004/0231408 | Shammai | Method and Apparatus For Determining An Optimal Pumping Rate Based On A Downhole Dew Point Pressure Determination |

A better understanding of the invention will be obtained from the following detailed description of the preferred embodiments and claims, taken in conjunction with the attached drawings.

BRIEF DESCRIPTION OF THE DRAWINGS

FIG. 1 is an elevational view of a hydraulic cylinder of the type which can be used such as for installing a plugging device into a pipeline and is representative of various applications relating to pipelines in which high temperatures and high pressures are frequently encountered. An explosion proof enclosure is supported to the cylinder by means of a mounting bracket.

FIG. 2 is an elevational view of the forward end of the explosion proof enclosure as taken along the line 2-2 of FIG. 1.

FIG. 3 is an exploded cross-sectional view of the explosion proof enclosure as taken along the line 3-3 of FIG. 2. This figure shows the basic components of the system of this invention that are mounted within the explosion proof enclosure and shows a threadably removable transparent closure.

DETAILED DESCRIPTION OF THE PREFERRED EMBODIMENTS

It is to be understood that the invention that is now to be described is not limited in its application to the details of the construction and arrangement of the parts illustrated in the accompanying drawings. The invention is capable of other embodiments and of being practiced or carried out in a variety of ways. The phraseology and terminology employed herein are for purposes of description and not limitation.

| 10 | Hydraulic cylinder |
|---|---|
| 12 | Cylinder mounting flange |
| 14 | Lower adapter |

-continued

| 16 | Flange |
|---|---|
| 18 | Control bar |
| 20 | Indicia |
| 22 | Flange |
| 24 | Flange |
| 26 | Cylindrical passageway |
| 28 | Upper packing |
| 30 | Lower packing |
| 32 | Guide bars |
| 34 | View window |
| 36 | Exterior of 12 |
| 38 | band |
| 40 | Bracket |
| 42 | Explosion proof enclosure |
| 44 | Enclosure window |
| 46 | Frame |
| 48 | Threads on 44 |
| 49 | Threads on 42 |
| 50 | Wireless network camera |
| 52 | Lens |
| 52A | Battery pack |
| 54 | Magnetically actuated switch |
| 56 | Mounting ring |
| 58 | Light card |
| 60 | Light source |
| 62 | Insulators |
| 64 | Camera antennas |

Referring first to FIG. 1, a hydraulic cylinder is indicated by the numeral 10 that has at its lower end a mounting flange 12. Positioned on the bottom of cylinder mounting flange 12 is a lower adapter 14 having at the bottom end thereof a mounting flange 16 by which the complete apparatus can be secured to other equipment (not shown), such as a plugging system for closing fluid flow through the interior of a pipeline, or to a completion plug that fits into a cylindrical opening for closing a passageway that leads to the interior of a pipeline. Cylinder mounting flange 12 is representative of any type of housing that receives a longitudinally positionable control bar.

Figure 6:
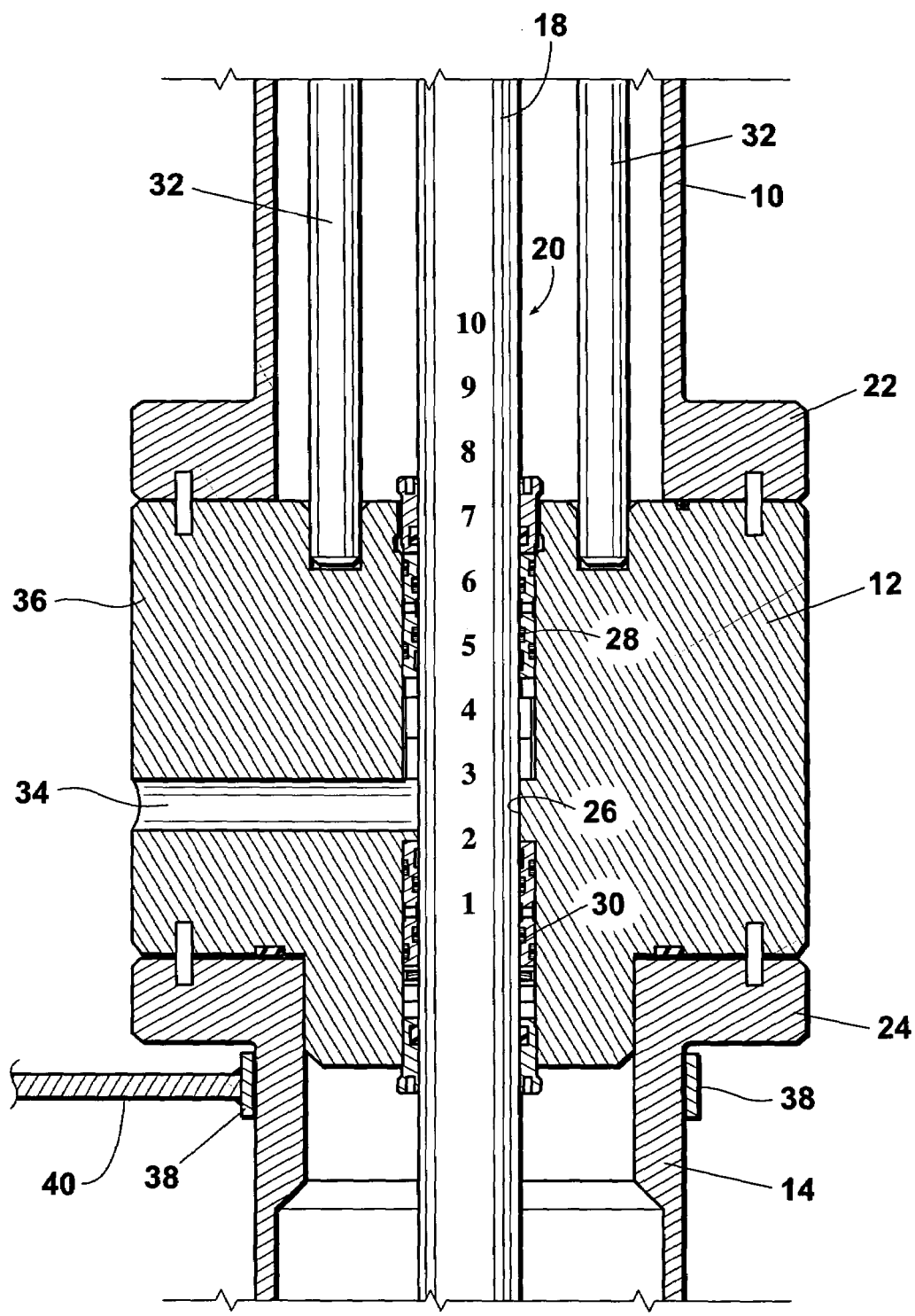
FIG. 6 is a fragmentary cross-sectional view of an intermediate portion of the hydraulic cylinder showing the control bar having indicia marked thereon. The invention herein is a system of observing the control bar indicia to enable an operator to remotely manipulate the position of the control bar in response to the observed indicia in a manner that the operator can be located at a safe position relative to the activity in which the control bar is engaged.

Positioned within hydraulic cylinder 10 is a piston (not seen) that is actuated by hydraulic pressure. Secured to the piston is a cylindrical control bar 18 as seen in FIG. 6. The function of cylinder 10 is to position control bar 18 in response to the application of hydraulic pressure. Components, such as valves, used to control a piston within cylinder 10 are not shown and it is understood that in practicing this invention that hydraulic fluid pressure to cylinder 10 is controllable by an operator from a remote location. The invention herein is not related to the control of the hydraulic cylinder, but instead the invention herein is to provide information to a remotely positioned operator as to the longitudinal status of control bar 18.

Affixed on the exterior surface of control bar 18, as shown in FIG. 6, is indicia generally indicated by the numeral 20. Indicia 20 is in the form of numerals 1 through 10 that are equally spaced apart from each other. This is by example only as indicia 20 can take many configurations and formats including lines subdividing the spacing between the numbers.

The lower end of hydraulic cylinder 10 includes a flange 22 and in like manner, the upper end of lower adapter 14 has a flange 24. Positioned between and secured to flanges 22 and 24 is the cylinder mounting flange 12. Typically flanges 22 and 24 are secured to cylinder mounting flange 12 by bolts, the bolts not being shown.

Still referring to FIG. 6, cylinder mounting flange 12 has a cylindrical passageway 26 therethrough that slidably receives control bar 18. An upper portion of passageway 26 is internally enlarged to receive upper packing 28 and in like manner a lower portion of the cylindrical passageway receives lower packing 30. Packing 28 and 30 serves to isolate fluid pressures within hydraulic cylinder 10 from the interior lower adapter 14 while nevertheless allowing control bar 18 to be laterally transposed.

Shown within hydraulic cylinder 10 are spaced apart guide bars 32 that are used to control rotation of the piston within hydraulic cylinder 10 and are not related to the invention herein.

As seen in FIG. 6 a view window 34 communicates cylindrical passageway 26 with the exterior 36 of the cylindrical mounting flange. Thus view window 34 provides optical access from exterior of the mounting flange to the indicia 20 formed on the surface of control bar 18. View window 34 may be round in cross-section, but is preferably square since cameras universally provide rectangular pictures.

In FIG. 6 indicia 20 on control bar 18 is shown facing the viewer while view window 34 is oriented 90° away. Obviously, indicia 20 must be positioned on control bar 18 so at all times to be visible through view window 34.

Figure 4:
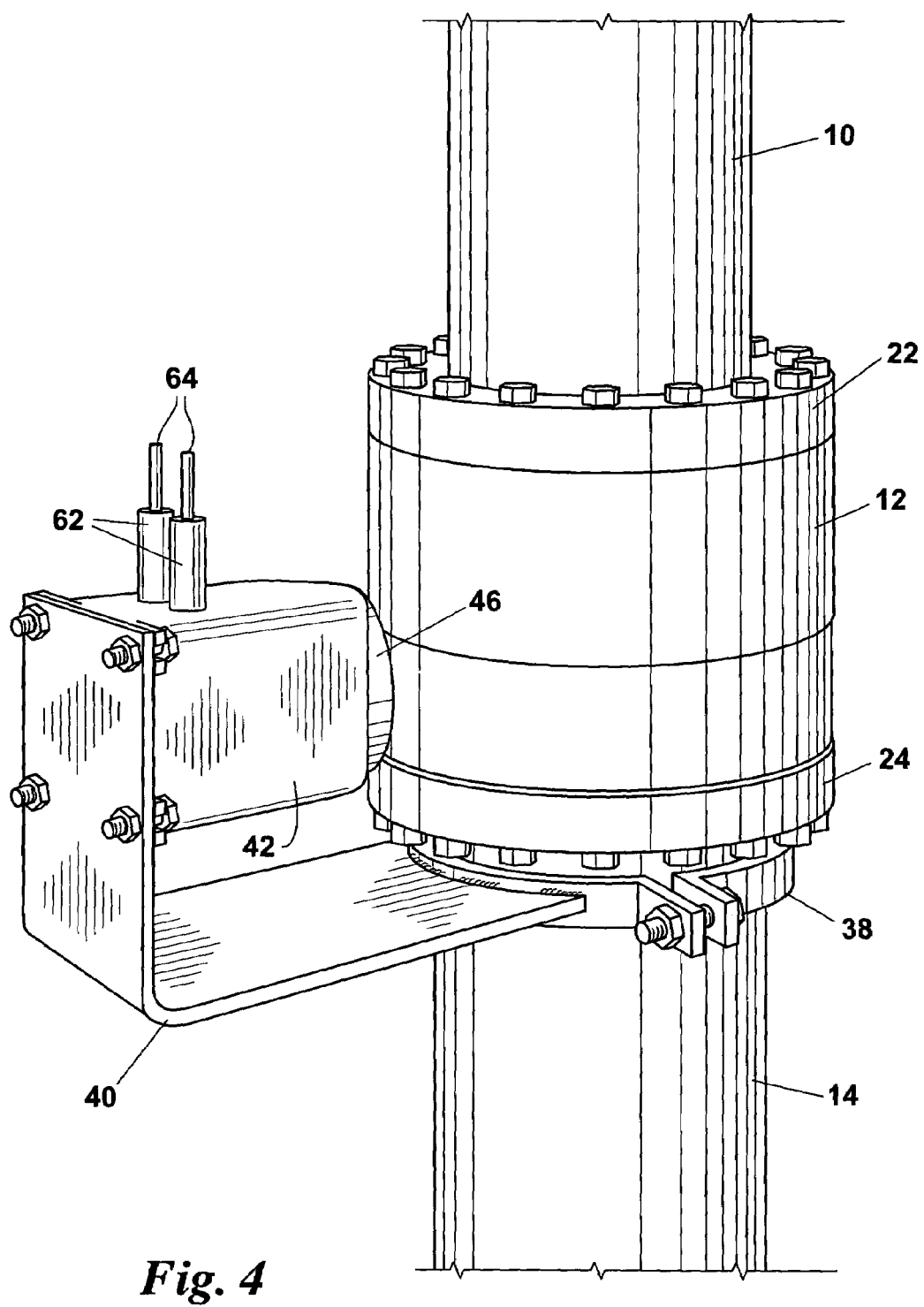
FIG. 4 is an external elevational fragmentary isometric view of the middle length of the hydraulic cylinder and a clamp on flanges to which the mounting bracket is affixed that supports the explosion proof enclosure.
Figure 5:
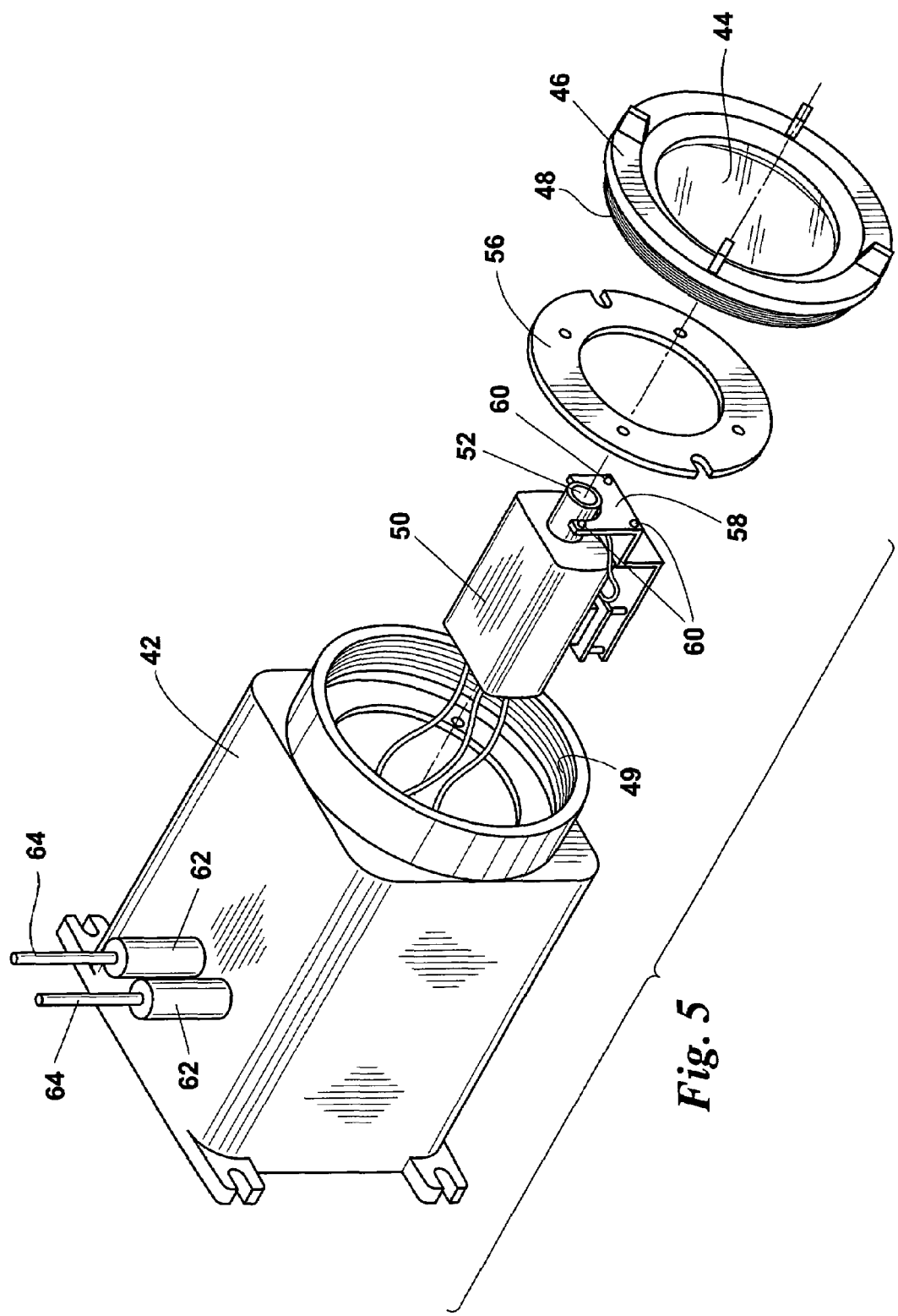
FIG. 5 is an exploded view of the enclosure and some of the basic components contained therein, including a video camera, a mounting ring, a light card and the removable cover.

Referring back to FIG. 1, there is positioned on the exterior surface of cylinder lower adapter 14 a metal band 38. Secured to it a bracket 40 that supports an explosion proof enclosure 42 that has, as seen in FIG. 5, a window 44 retained in a circular frame 46. Bracket 40 supports explosion proof enclosure 42 so that window 44 is in alignment with view window 34. Enclosure window 44 is transparent and is made of pressure resisting glass or plastic. Frame 46 has circumferential threads 48 that thread into an opening 49 in the explosion proof enclosure 42.

Positioned within the explosion proof enclosure 42 is a wireless network capable camera 50 having a lens 52 that is in alignment with aperture 34 in cylinder mounting flange 12. Also enclosed within the interior of explosion proof enclosure 42 is a battery pack 52A and a magnetically actuated switch 54 (See FIG. 3). In addition, a mounting ring 56 surrounds and positionally stabilizes camera 50. A light card 58 has on it a plurality of light source 60. In the embodiment illustrated there are three light sources 60 positioned around and slightly rearwardly of lens 52, however, only one or two may actually be required.

Mounted in the top surface of explosion proof enclosure 42 are a pair of insulators 62 that support a pair of camera antennas 64.

The function of the light source 60 is to provide illumination that passes out of the housing 42, through transparent enclosure window 64 and through view window 34 to illumines the exterior surface of control bar 18, including specifically indicia 20. As control bar 18 is longitudinally positioned during the installation or removal of a plugging tool or completion plug various indicia 20 pass the view window 34 and are illuminated by light emitting diodes to produce pictures picked up by wireless network camera 50.

Video images from camera 50 are transmitted over antenna 64 and can be received in a variety of ways including by the use of a wireless personal digital assistant or a personal computer. An operator can therefore be located at a safe distance away from the equipment that includes hydraulic cylinder 10 while nevertheless the operator can by remote controls (not shown) control the cylinder and therefore the position of control bar 18. If for any reason high temperature, poisonous or explosive gases or liquids should escape as the control bar is being actuated an operator can be located a safe distance away so as to remove the possibility of physical injury.

The system can employ wireless networks, including a wireless router (not shown) for routing the video signal transmitted from camera antennas 64 so as to enable a plurality of monitors, such as personal computers (PCs) or personal data assistants (PDAs), to receive signals providing a pictorial indication of the position of control bar 18. Such wireless router can typically be mounted in a weather-tight plastic enclosure and could be secured to the hydraulic power unit such as to hydraulic cylinder 10.

As previously stated, there is positioned within the interior of explosion proof enclosure 42 a magnetically actuated switch 54. By using a magnet that can be passed adjacent to the exterior of explosion proof enclosure 42 the camera system, including the lights, can be turned on without the need to provide access to the interior of the housing. In like manner, when the camera and lights are not needed, a magnet can be used to turn off these elements. By the use of a magnetic switch the necessity of providing physical communication between the interior and exterior of explosion proof housing 42 is eliminated to thereby further help secure the integrity of the housing.

Light required to illuminate indicia 20 can be supplied by light source 60 as described, however the term "light emitting diodes" is inclusive of any miniature light generating device that uses battery power.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A remote monitor system for a longitudinally positionable control bar having position indicating indicia thereon, comprising:

an elongated tubular housing receiving the control bar therein and having an intermediate cylindrical mounting flange member having an aperture in a sidewall communicating between the control bar and an exterior housing surface;

an explosion proof enclosure mounted exteriorly of the housing and having a transparent window in alignment with said aperture;

a wireless network camera positioned within said explosion proof enclosure having a lens with a visual path through said window and in alignment with said housing aperture;

said wireless network camera positioned within said explosion proof enclosure being configured to transmit a signal of video images provided thereby;

a battery power source within said explosion proof enclosure providing energy to said camera for providing remotely receivable control bar position indicating images; and a bracket secured to said housing adjacent said cylindrical mounting flange member and having a portion to which said explosion proof enclosure is mounted.

2. A remote monitor system for a longitudinally positionable control bar according to claim 1 including:

a light source within said explosion proof housing providing light that passes through said window and said aperture to illuminate the control bar.

3. A remote monitor system for a longitudinally positionable control bar according to claim 2 wherein said light source supported within said explosion proof enclosure is supported slightly rearwardly of said camera for illuminating the position indicating indicia on the control bar.

4. A remote monitor system for a longitudinally positionable control bar according to claim 2 wherein said light source is a light emitting diode.

5. A remote monitor system for a longitudinally positionable control bar according to claim 1 including:

a transmitting antenna affixed to an exterior surface of said explosion proof enclosure and sealably communicating with said wireless network camera.

6. A remote monitor system for a longitudinally positionable control bar according to claim 1 including:

a magnetically actuatable switch mounted within said explosion proof enclosure and connected between said battery power source and said camera by which said camera can be turned on and off by means exterior of said explosion proof enclosure.

7. A remote monitor system for a longitudinally positionable control bar according to claim 1 wherein video images transmitted by said wireless network camera are simultaneously receivable by personal digital assistants and/or personal computers.

* * * * *